United States Patent [19]

Tamamori

[11] Patent Number: 4,883,089
[45] Date of Patent: Nov. 28, 1989

[54] RAILWAY CAR PRESSURE CONTROL VALVES

[75] Inventor: Hideo Tamamori, Kobe, Japan
[73] Assignee: Nippon Air Brake Co., Ltd., Kobe, Japan
[21] Appl. No.: 278,518
[22] Filed: Dec. 1, 1988
[30] Foreign Application Priority Data Dec. 8, 1987 [JP] Japan .................. 62-186765[U]

[51] Int. Cl.⁴ .................. G05D 16/00; F16K 31/126
[52] U.S. Cl. .................. 137/596.18; 137/627.5; 137/85
[58] Field of Search .................. 137/85, 627.5, 596.18, 137/102, 116.3; 303/40

[56] References Cited
U.S. PATENT DOCUMENTS

| | | | |
|---|---|---|---|
| 2,716,017 | 8/1955 | Linker | 251/331 |
| 2,825,361 | 3/1958 | Seljos | 137/596.18 |
| 2,958,337 | 11/1960 | Holbrook | 137/596.18 |
| 3,018,136 | 1/1962 | Williams | 137/627.5 X |
| 4,724,859 | 2/1988 | Nakao | 137/627.5 X |

Primary Examiner—Alan Cohan
Attorney, Agent, or Firm—J. B. Sotak

[57] ABSTRACT

A pressure control valve for railway vehicles having a variable control mechanism for adjusting the gain of the output pressure to input pressure by controlling the effective area ratio on opposite sides of a piston. A balance diaphragm disposed on one side of the piston and a control diaphragm disposed on the other side of the piston. A plurality of first radial fins carried by the piston and a plurality of second radial fins carried by the body of the control valve. The ends of the first fins are placed between the ends of the second fins so that the edges form a slant surface. Thus, at least one of the diaphragms is supported by the slanted surface of the first and second fins. A manual adjusting mechanism for varying the position of the piston of the valve for changing the ratio of the effective areas.

8 Claims, 3 Drawing Sheets

PRIOR ART

RAILWAY CAR PRESSURE CONTROL VALVES

FIELD OF THE INVENTION

This invention relates to pressure control valves, such as, relay valves, response load valves, three pressure type control valves which are used in the air brake system of a railway car.

BACKGROUND OF THE INVENTION

A relay valve shown and described in Japanese Patent No. 44-27163 is one example of the prior art type of a pressure control valve and will now be explained in greater detail with reference to FIG. 4 of the subject application.

As shown in FIG. 4, an air supply chamber is characterized by numeral 1 while an output chamber is characterized by number 2. An exhaust chamber is illustrated by number 3 and an air supply valve is depicted by number 4. Further, it will be seen that an exhaust valve rod is depicted by numeral 5 and a piston is characterized by numeral 6.

In viewing FIG. 4, it will be observed that the air supply chamber 1 has an air supply passage 7 which is connected to the output chamber 2. A connecting port 8 is connected to a suitable compressed air reservoir via a pipe or conduit 8a. A valve seat 9 circumscribes the air supply passage 7 and projects upwardly from the lower side of the air supply chamber 1.

The output chamber 2 has a connection port 10 which is connected to a brake cylinder or the like, and also has an equalizing passage or hole 12 which is connected to a balance chamber which is disposed above the movable piston 6.

The exhaust chamber 3 is open to the atmosphere via the port 13.

The air supply valve 4 is located in the air supply chamber 1 and the upper reduced portion of it is in the back chamber 14 so that it can slide freely in the vertical direction to open and to close the air supply passage 7. The valve 4 is urged downwardly by a biasing or compression spring 15 which is disposed in the back chamber 14 so that it normally causes the valve 4 to seat on the valve seat 9. As shown in FIG. 4, an equalizing passage or hole 16 is located in the lower wall of the valve 4.

As shown, the exhaust valve rod 5 extends through the output chamber 2, through the exhaust chamber 3, and to the balance chamber 11. The upper flared rim or tip 17 of the exhaust valve rod 5 faces the underside of the air supply valve 4. Thus, the outside diameter of rod 5 is designed so that it forms the air supply passage 7. The rod 5 penetrates the wall dividing chambers 1 and 2 and slides freely there between but is air tight by suitable sealing rings. The enlarged piston portion 6 is located at the lower end of rod 5. The rod 5 has a central internal exhaust passageway 18 which extends from upper open end of the tip portion 17 to an opening formed at the other end leading to the exhaust chamber 3.

An enlarged main part 6a of piston 6 has a flange shape portion formed on the lower end of the exhaust valve rod 5. The inner edge of a resilient diaphragm 19 is attached on the outer periphery of the piston main part. The outer edge of the diaphragm 19 extends outwardly and is fixedly attached to the inner surface of the inside wall of the main body of the valve. The upper side of the piston 6 and diaphragm 19 form the above-mentioned balance chamber 11 and the lower side defines a command chamber 20. There is a return spring 21 in control chamber 20 which pushes the piston 6 toward the balance chamber 11. The control chamber 20 has a connection port 22 which connects to an air control supply exhaust pipe 22a.

In this pressure control valve, the condition shown in FIG. 4 is in an overlap state. In the overlap state, the upper tip 17 of the exhaust valve rod 5 is in intimate contact with the air supply valve 4 while the air supply valve 4 is seated on the valve seat 9. In other words, it is the condition in which the output chamber 2 is blocked off from the air supply chamber 1 and also in which the output chamber 2 is blocked off from the exhaust chamber 3.

In this overlap condition, the control force with which the control air pressure P1 in the control chamber 20 pushes the piston 6 upwardly is $P2 \times S1$, and the balance force with which the output air pressure P2 in the output chamber 2 pushes the piston 6 downwardly is $P2 \times S2$. The above-mentioned S1 is the effective area of the lower surface of the piston 6 and diaphragm on which the control pressure P1 in the air chamber acts, and S2 is the effective area of the upper surface of the piston 6 and diaphragm 119 on which the output air pressure P2 acts. When the force exerted by the return spring is F, the following equation is valid:

$$P2 \times S2 + F = P1 \times S1$$

Since F is small, the output air pressure can be described by the following equation:

$$P2 = (S1/S2) \times P1$$

In other words, the output air pressure P2 is the product of the control air pressure P1 and the effective area ratio of both sides of piston 6.

In this overlap condition, when the control air pressure P1 decreases, the control force becomes less than the balance force, and the piston 6 moves downwardly so that the tip 17 of the exhaust valve rod 5 is unseated from the air supply valve 4, the output chamber 2 connects to the exhaust chamber 3 via the exhaust opening 18. Thus, the output air pressure P2 decreases as a result of this exhausted condition so that the balance force decreases. Now when the balance force is equal to the control force, the valve returns to the overlap condition again. When the control air pressure P1 is reduced to atmospheric pressure, the output air pressure P2 is also reduced to atmospheric pressure.

In addition, in the overlap condition illustrated in FIG. 4, when the control air pressure P1 is increased, the control force becomes greater than the balance force, and the exhaust valve rod 5 pushes the air supply valve 4 upwardly to unseat it from the valve seat 9. In this manner, the air is supplied from the air supply chamber 1 to the output chamber 2 through the air supply passage 7. As a result of this air supply motion, the output air pressure P2 rises and the balance force also increases. When the balance force increases and is equal to the control force, it returns to the overlap condition.

Thus, in the pressure control valve illustrated in FIG. 4, the control air pressure P1 is changed so that a corresponding output air pressure P2 can be obtained. The output air pressure P2 may be used, for example, to operate a vehicle brake system.

In the pressure control valve of FIG. 4, there is only one piston 6 which is separated into a control piston on which the control air pressure P1 acts and which operates as a balance piston on which the output air pressure P2 acts.

The pressure control valve of FIG. 4 is designed so that the ratio of S1/S2 in equation $P2=(S1/S2)\times P1$ becomes constant. However, the characteristic of the output air pressure P2 to the control air pressure P1 may be changed depending on the type of air brake system. In other words, one in which the effective area ratio S1/S2 of the piston is different as required. In such a case, it can be managed by changing one of the effective areas S1, S2 in the pressure control valve of FIG. 4, but in reality, it is very inconvenient to change the design and to have to manufacture it individually for each particular application.

The prior art includes another method to change the effective area ratio of S1/S2, namely the one illustrated in FIG. 4 of the Japanese utility Model No. 61-2119. In this latter arrangement, there is an equivalent to the above-mentioned piston 6 which takes the form of the balance piston and the control piston, and a lever mechanism consisting of the lever and the fulcrum roller is placed between the two pistons, and there is a method to adjust the position of the fulcrum roller. In this structure, the lever ratio can be changed by changing the position of the fulcrum roller so that the size of the force transmitted changes, and, it therefore achieves practically the same result as in the case which the effective area ratio are changed.

In the latter mentioned pressure control valve, the structure of which includes the lever mechanism, the characteristic of the output air pressure P2 to the control air pressure P1 can be changed by adjusting the position of the fulcrum roller. However, the member in the axial direction of the piston provided between the lever and the piston is inclined slightly due to the rotation of the lever during the operation. Thus, it becomes difficult to transmit the work force precisely, and/or the part which affects the function, such as the part of that member which contacts the lever. Namely, the contacting part of the fulcrum roller and the lever tends to become worn so that even if the fulcrum roller is placed at the same position, the output air pressure to the defined control air pressure will be different from the original initial pressure. Thus, after it has been in use for a long time a decrease in sensitivity and response is a problem.

OBJECTS AND SUMMARY OF THE INVENTION

Therefore, it is the object of this invention to make it possible to change the ratio of the effective area of two pistons without using the lever mechanism and without changing the control piston and the balance piston.

In the pressure control valve in which the piston of the pressure control valve of the prior art, as explained in FIG. 4, is formed by the control piston and the balance piston. The invention achieves its object in that there are an air supply chamber, an air supply hole, a valve seat and an air supply valve in a middle body. This middle body can be moved relative to the exhaust valve rod and also it can be fixed at any desired position. The opposite side of the control air pressure or the output air pressure of at least one piston of the two pistons is set at a pressure value which is lower than a minimum supply air pressure value. A plurality of first movable fins are arranged and fixed around the main body of the piston on the side of the lower pressure with its upper edges facing a flexible diaphragm carried by the piston. A plurality of second fixed fins interleaved with the plurality of the first fins are arranged and fixed inside the valve main body. The first fins and the second fins are located between each other and the second fins have upper edges which are on the same side of the diaphragm and are adapted to cross over one another.

In this invention, when the position of the middle body is changed, the position of the valve seat of the middle body also changes. Therefore, the position of the exhaust valve rod changes when it assumes the overlap position in which the air supply valve is seated on the valve seat, and the valve tip of the exhaust valve rod is engaging the air supply valve. The change in the position of this exhaust valve rod changes the position of the control piston main body and the balance piston main body which move together in a unitary manner.

A first slanted surface and a second slanted surface cross one another means so that at least one of the surfaces is not in contact with a surface which is perpendicular to the direction of movement of both pistons, so that the condition in which the diaphragm receives the air pressure and is pushed toward the first surface and the second surface and changes as a function of the position of the control piston main body or the balance piston main body. This change results in the modification of the effective pressure area of the control piston and/or the balance piston.

Consequently, when the position of the middle body is changed the effective area of at least one position in the overlap state is changed so that the effective area ratio of both pistons changes.

In accordance with the present invention there is provided a railway car pressure control valve comprising, an adjustable middle body member having an air supply chamber, an air supply valve and a valve seat, the air supply chamber is connected to a source of compressed air, an output chamber is connectable to an output passage, an exhaust chamber is opened to the atmosphere, the valve seat located in an air supply passage connects the air supply chamber to the output chamber, the air supply valve is biased by a spring toward the valve seat, an exhaust valve rod having a valve tip which faces the air supply valve and fits loosely in the air supply passage and having an exhaust passage which has one end open at the valve tip and which has the other end open to the exhaust chamber, a control piston having a center portion attached to an inner periphery of a control piston diaphragm, the control piston diaphragm having an outer periphery fixed to the inside wall of a valve main body for defining a control chamber, a source of control air pressure connected to the control chamber to provide a pressure force to move the exhaust valve rod in the direction of the air supply valve, a balance piston having a center portion attached to an inner periphery of a balance piston diaphragm, the balance piston diaphragm having an outer periphery fixed to the inside wall of the valve main body for defining a balance chamber which receives the air pressure from the output chamber proving a balancing force to resist the pressure force of the control chamber.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
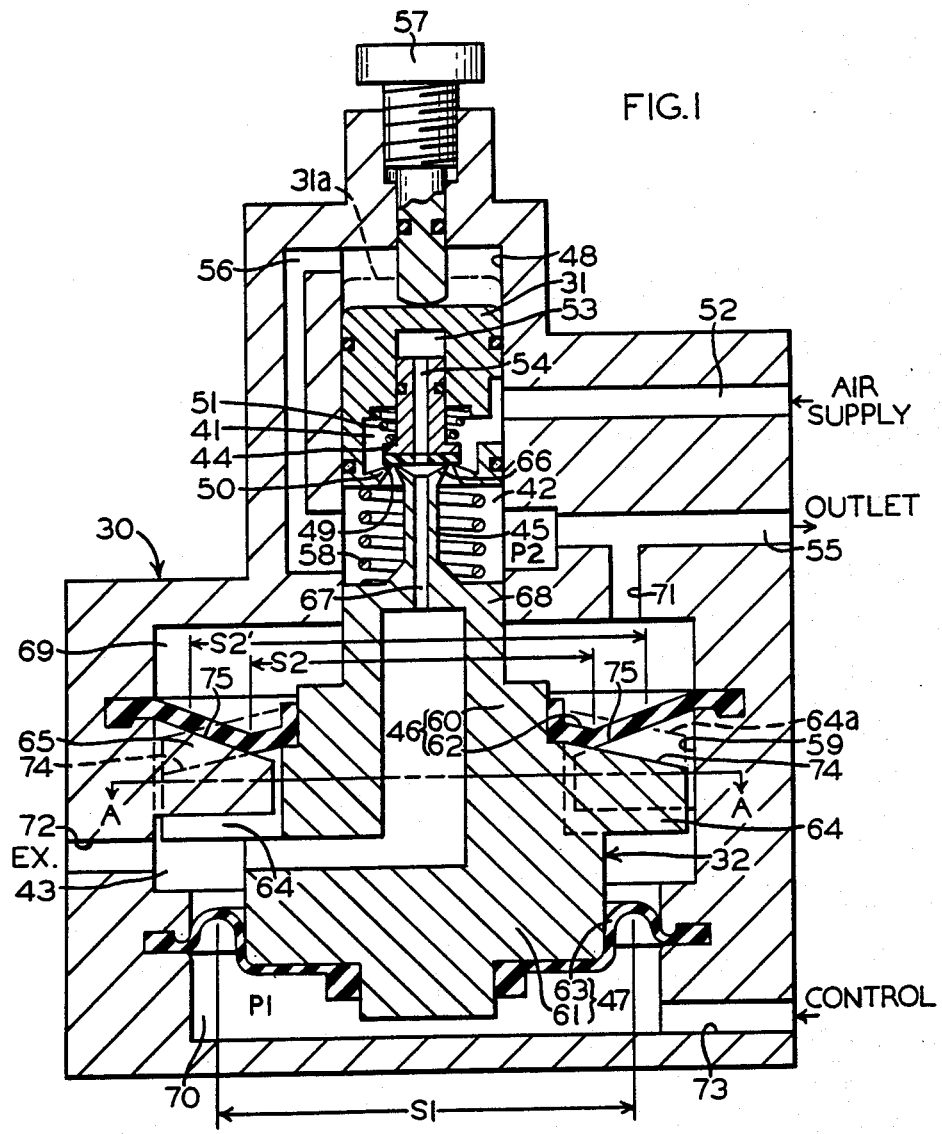
FIG. 1 is a vertical cross-sectional frontal view showing the details of the valve structure of a first embodiment of the present invention.
Figure 2:
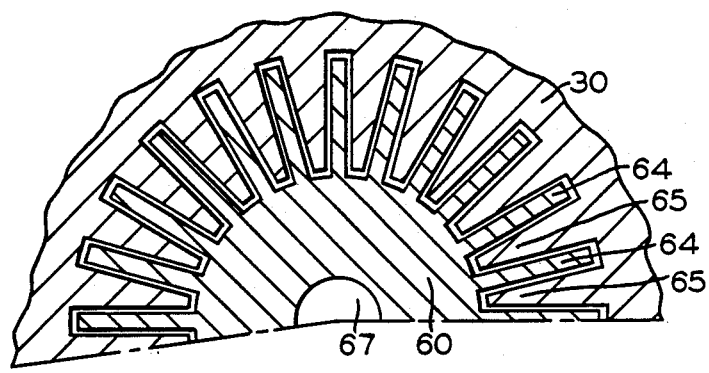
FIG. 2 is a partial cross-sectional view taken along line A—A of FIG. 1.

Referring now to the drawings, and in particular to FIGS. 1 and 2, there is shown a first embodiment which will be presently explained. The pressure control valve shown in the FIGS. 1 and 2 includes a middle body member 31 and a piston element 32 located in the valve main body 30. In FIG. 1, there is shown an air supply chamber 41, an output chamber 42, an exhaust chamber 43, an air supply valve 44, an exhaust valve rod 45, a balance piston 46, and a control piston 47.

The external shape of the middle body member 31 is that of a short cylinder. The short middle body 31 is sealingly fitted into an inner hole 48 formed in the upper part of the valve main body 30 as shown in FIG. 1. It will be appreciated that the body 31 can move up and down or in the vertical direction. The air supply chamber 41 is located in the lower end of the middle body 31. A valve seat 50 controls the flow of fluid through the air supply passage 49 which is adapted to open and close the lower end of the air supply chamber 41. The movable air supply valve 44 is located inside the air supply chamber 41. The valve 44 is urged downwardly to a closed position by a compression or biasing spring 51 so' that it normally is seated on the valve seat 50. The air supply chamber 41 is always connected to the pressure air source through an inlet passage 52 which is formed in the side of the valve main body 30. The air supply valve 44 is equipped with a central passage 54 which connects a back chamber 53 which is located in the upper end thereof. The lower end of the passage 54 is located in the vicinity of the air supply passage 49.

The outlet chamber 42 is located on the underside of the middle body 31. The output chamber 42 is connected to the brake cylinder of the vehicle brake system via a passage 55 which is formed in the side of the valve main body 30. A passage 56 forms a fluid path which connects the output chamber 42 and an upper chamber located above the middle body 31, namely, the upper most space which is part of the inner hole 48. Alternatively, the upper space of the inner hole 48 can be vented to the atmosphere so that the passage 56 may be omitted.

As shown in FIG. 1, an adjustable screw 57 and a return biasing spring 58 engage the upper and lower ends of the middle body 31 for adjusting the position and fastening the middle body 31. The adjusting screw 57 extends through a threaded opening formed in the top end of the valve main body 30. The screw 57 has an outer turnable head portion and an inner tip portion which contacts the upper surface of the middle body 31. The compression return spring 58 is caged between the upper part of a main piston 32 and the underside of the middle body 31. The rotation of the screw 57 adjusts the tension of the return spring 58 and causes the middle body 31 to be moved to the desired position.

The piston 32 is disposed in the inner opening 59 formed in the lower portion of the valve main body 30. The piston 32 consists of the balance piston main body 60 which is integrally connected to the lower end of the exhaust valve rod 45. The piston includes a control piston main body 61 and a diaphragm 62 forming the balance piston and a diaphragm 63 of the control piston having first fin 64 and second fin 65 as shown in FIGS. 1 and 2.

The upper rim or seat tip 66 of the exhaust valve rod 45 faces the air supply valve 44 and projects from the underside of the output chamber 42. The outside diameter of tip 66 is substantially equal to the inside diameter of the back chamber 53 of the air supply valve 44. An internal exhaust passage 67 is formed in the rod 45. One end of the exhaust hole 67 opens to the tip 66 while the other end opens to the exhaust chamber 43 via a passage formed in the piston part 32.

The balance piston main body 60 and the control piston main body 61 are formed by a lower section 68 which is contiguous with the exhaust valve rod 45. Thus, these piston members move together with the exhaust valve rod 45. The direction of movement is vertical as is viewed in FIG. 1. The lower part 68 of the exhaust valve rod 45 fits in the lower part of the inner hole 48 forming the valve main body 30 so that it slides freely therein. The inner peripheral edge of the diaphragm 62 is fixedly attached to the circumference of the balance piston main body 60 while the outer peripheral edge is fixedly attached to the wall of the inner opening 59 of the valve main body 30. The inner edge of the diaphragm 63 is connected to the lower portion of the control piston main body 61 while the outer edge is fixed to the wall of the inner opening 59 of the valve main body 30. The diaphragms 62 and 63 are both fabricated of a suitable flexible material. By employing the two diaphragms 62 and 63, the inner opening 59 is divided into an upper balance chamber 69, the intermediate exhaust chamber 43 and a lower control chamber 70. The balance chamber 69 is connected to the output chamber 42 via an opening 71. The exhaust chamber 43 has an exhaust passageway 72 which is formed in the wall of the valve main body 30. The control chamber 70 has a control passage 73 which leads to a source of control air pressure. As shown, the passageway 73 extends through the wall of the valve main body 30. In viewing FIGS. 1 and 2 there are a number of first radial fin members 64 formed on the inside of the exhaust chamber 43 which are integrally formed on the balance piston main body 60. The fins 64 take the form of a star-shaped arrangement as shown in FIG. 2. Each of the fins have their outer edges in close proximity to the inner surface of the inner opening 59. The upper edges 74 of the fins adjacent the diaphragm 62 form a straight line surface which is inclined downwardly and outwardly as viewed in FIG. 1. A number of second radial fin members 65 extend from the wall of the inner opening 59 of the valve main body 30. The second fins 65 are interposed between each of the first fins 64 and the upper edges 75 adjacent the diaphragm 62 to form a straight surface which inclines downwardly and inwardly. The inclined surface which connects the edges 74 of the first fins 64 and the inclined surface which connects the edges 75 of the second fins 65 are crossed between the balance piston main body 60 and the wall of the inner hole 59. The intersection line forms a concentric circle with the balance piston main body 60, and the diameter of the circle of the intersection line changes by the movement of the said piston main body 60 in the axial direction.

A pressure control valve is designed in such a manner that the area S1 is the effective area of the control piston 47 consisting of the control piston main body 61 and the diaphragm 63 then area S2 is the effective area of the balance piston 46 consisting of the balance piston main body 60 and the diaphragm 62. When a control air pressure P1 acts on the control chamber 70 and it assumes the overlapped state as shown in the drawings, and accordingly the output air pressure P2 in the output chamber 42 can be indicated as follows:

$$P2 = (S1/S2) \times P1$$

which is the same as the prior art. Here, the effective area S2 of the balance piston 46 is the surface area where the cross-section of the tip 66 of the exhaust valve rod 45 is subtracted from the area which is inside the circle of the above-mentioned intersection line. That is because, inside the circle of the above-mentioned intersection line, the diaphragm 62 is touching the first fin 64 which is protruding from the balance piston main body 60 so that the work force by the pressure in the balance chamber 69 is transmitted to the balance piston main body 60 inside this circle. However, it is in contact with the second fin 65 which protrudes from the valve main body 30 outside said circle, and the work force of the pressure in the balance chamber 69 is transmitted to the side of the valve main body 30 and does not extend to the balance piston main body 60.

In this pressure control valve, the effective area S2 of the balance piston 46 can be varied by changing the position of the middle body 31. In other words, changing the position of the middle body 31 can be done by moving it vertically by rotating the screw 57. For example, if it is moved upward, it moves while maintaining the state in which the middle body 31 is still in contact with the lower end of the screw 57 by the action of the return spring 58. If the position of the middle body 31 changes as indicated by the imaginary line 31a in FIG. 1 in order to reach the overlapped state, the tip 66 of the exhaust valve rod 45 rises so that the balance piston main body 60 and the control piston main body 61 which are one body with the exhaust valve rod 45 also rise. Therefore, in the overlapped state after changing the position of the middle body 31, the diameter of the intersection line related to the effective area S2 of the above-mentioned balance piston 46, increases compared with that before, and the effective area S2' becomes larger than the previous effective area S2. The dashed line 64a in FIG. 1 indicates the position of the first fin in the overlapped state after the position of the middle body has been changed.

This change of the effective area of the balance piston from S2 to S2' is the change of the above-mentioned effective area ratio from S1/S2 to S1/S2' so that the characteristic of the output air pressure P2 to the control air pressure P1 can be changed.

The first embodiment shows the one in which the upper edges 74 and 75 on the side of the diaphragm 62 corresponding to the first fin 64 and the second fin 65 are inclined in the direction of the extending fin. However, it is apparent that one of the upper edges 74 or 75 of the fins can be horizontal, namely, in the direction perpendicular to the axial line of the piston. In other words, in either cases, the effective area of the balance piston 46 in the overlapped state is changed by changing the position of the middle body 31, and the effective area ratio of the control piston 47 and the balance piston 46 will be changed or varied.

In addition, although the first embodiment is the structure in which there is a fin to the balance piston main body 60 and the side of the valve main body 30 which faces the balance piston main body, instead of this, there can be a fin which is equivalent to the first fin 64 and the second fin 65 on the side of the control piston 47. In the same way, the effective area ratio of the control piston 47 and the balance piston 46 can be changed. However, when there is more than one control air pressure chamber, namely, one on both sides of the control piston 47 when the control piston 47 is constructed in multiples, the different control air pressures work separately. In addition, it assumes the overlapped position in the balanced form to the total control force, for example, in the case where it is applied to the three pressure type control valve as illustrated in FIG. 1 of Japanese Patent No. 59-19866. Also, when it is applied to the multi-level relay valve as illustrated in FIG. 6 of Japanese Patent No. 62-33106. Therefore, the structure of the first embodiment is more appropriately employed.

Figure 3:
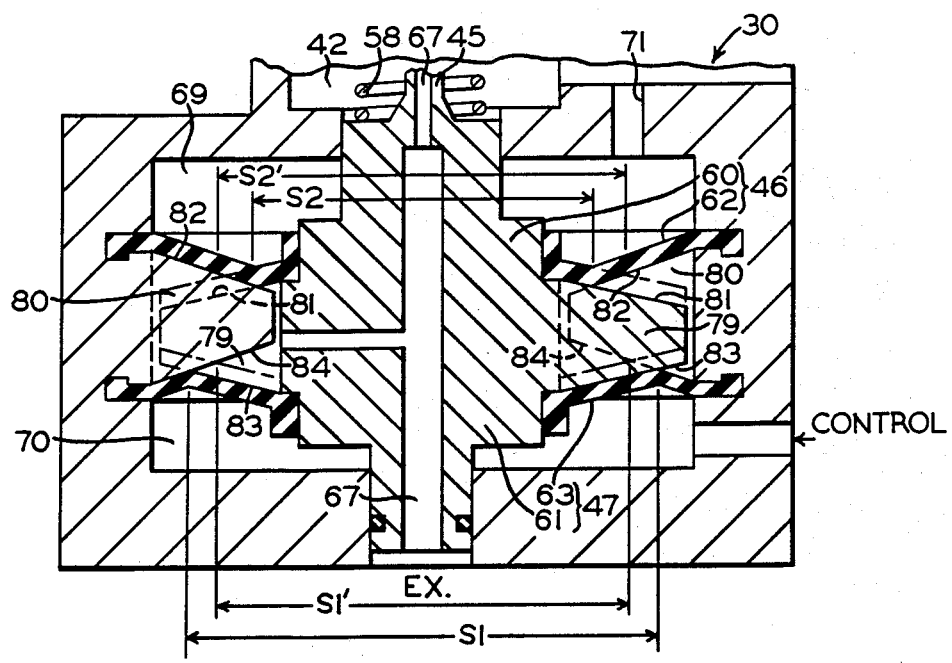
FIG. 3 is a partial vertical cross-sectional frontal view of a second embodiment of this invention.
Figure 4:
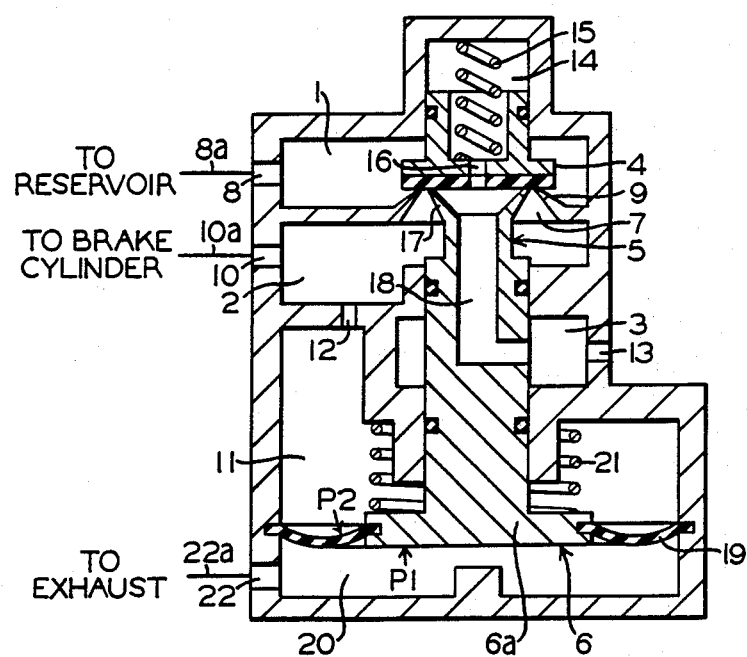
FIG. 4 is a schematic vertical cross-sectional frontal view illustrating one embodiment of prior art relay valve.

The following is an explanation of the second embodiment with reference to the accompanying FIG. 3. The main difference of this second embodiment from the first embodiment is the fact that the first fin 79 is provided on both the balance piston main body 60 and the control piston main body 61. In addition, there is a second fin 80 corresponding to the first fin 79. The upper edges 81 and 82 are situated adjacent the balance piston diaphragm 62 while the lower edges are situated adjacent the control piston diaphragm 63. Thus, the first fin 79 and the second fin 80 face the respective diaphragms and are in contact therewith.

The cross sectional shape of the first and second fins 79 and 80, perpendicular to the piston axis, is approximately the same as in FIG. 2. The upper edges 81 and 82 of the first and second fins 79 and 80 are adjacent the side of the diaphragm 62 and are sloped down along the extending direction of each fin which is the same as in the first embodiment. However, the lower edges 83 and 84 of the control piston 47 are adjacent the side of the diaphragm 63 and are sloped up along the extending direction of each fin. Thus, the diaphragm 63 is in contact to the lower edges 83 and 84. An additional difference is the fact that the exhaust passage 67 is also connected between the diaphragms 62 and 63 while at the same time it is opened to atmosphere through an opening 16 formed in the bottom end of the valve main body 30. However, the upper portion, which is not shown in the FIG. 3 is the same as shown and disclosed in FIG. 1.

The pressure control valve of the second embodiment can change the effective area ratio of the control piston 47 and the balance piston 46 by changing the position of the middle body 31. In other words, FIG. 3 is indicative of the overlap condition in which the middle body 31 is in the first position in the overlap condition in which the position of the middle body 31 is shifted upwardly to the second position, the diameter of the circle made by the line in which the inclined surface which connects the upper edge 81 of the first fin by the diaphragm 62 of the balance piston 46 and the inclined surface which connects the upper edge 82 of the second fin 82 intersects is larger than that shown in FIG. 3. The diameter of the circle made by the line in which the inclined surface which engages the lower edge 83 to the first fin by the diaphragm 63 of the control piston 47, and the inclined surface which engages the lower edge 84 of the second fin intersects is smaller than that shown in FIG. 3. Therefore, the effective area of the balance piston 46 changes from S2 to S2' which is larger than S2, and the effective area of the control piston 47 changes from S1 to S1' which is smaller than S1, so that the effective area ratio changes from S1/S2 to S1'/S2'.

In this second example also, one of the upper edges 81 or 82 of the fin, or one of the lower edges 83 or 84 can be perpendicular to the piston axis.

As described above, by means of this invention, the position of the balance piston and the control piston in the overlap condition to the valve main body can be changed merely by changing the position of the middle body. The relative position of the first fin and the second fin is changed by this manipulation. Thus, the effective area ratio of the control piston and the balance piston can be varied. Therefore, the characteristic of the output air pressure to the control air pressure can be changed without replacing the piston as was the case in the prior art. Further, the lever mechanism which causes problems over a long period of operation may be omitted. Compared to the technique of the prior art, in particular the arrangement which uses the lever mechanism, the pressure control valve of this invention uniquely employs the control force and the balance force which oppose each other on the same axis so that the balance piston and the control piston are placed on the same axis. Thus, the problem associated with the lever mechanism namely, the fact that a force other than in the axial direction acts on the piston can be solved.

In addition, the control valve of this invention can be used without any problem in a three pressure control valve, multi-level control valve, load-dependent valve as a pressure control valve in the pneumatic brake system of a railway car. The following is a nomenclature list of components or elements shown and disclosed in the drawings and specifications of the subject invention:
31.—middle body member,
59.—inner opening,
60.—balance piston main body,
61.—control piston main body,
62.—diaphragm of the balance piston,
63.—diaphragm of the control piston,
64.—first fin,
65.—second fin,
66.—valve tip,
67.—exhaust passage,
69.—balance chamber,
—control chamber,
72.—exhaust passage,
73.—control passage,
74.—upper edge of the first fin,
75.—upper edge of the second fin,
79.—first fin,
80.—second fin,
81,83.—upper and lower edges of the first fin,
82,84.—upper and lower edges of the second fin, Thus, the present invention has been described in such full, clear, concise and exact terms as to enable any person skilled in the art to which it pertains to make and use the same, and having set forth the best mode contemplated of carrying out this invention. I state that the subject matter, which I regard as being my invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

I claim:

1. A railway car pressure control valve comprising, an adjustable middle body member having an air supply chamber, an air supply valve and a valve seat, the air supply chamber is connected to a source of compressed air, an output chamber is connected to an output passage, an exhaust chamber is opened to the atmosphere, the valve seat located in an air supply passage connects the air supply chamber to the output chamber, the air supply valve is biased by a spring toward the valve seat, an exhaust valve rod having a valve tip which seats on the air supply valve and fits loosely in the air supply passage and having an exhaust passage which has one end open at the valve tip and which has the other end open to the exhaust chamber, a control piston having a center portion attached to an inner periphery of a control piston diaphragm, the control piston diaphragm having an outer periphery fixed to the inside wall of a valve main body for defining a control chamber, a source of control air pressure connected to the control chamber to provide a pressure force to move the exhaust valve rod in the direction of the air supply valve, a balance piston having a center portion attached to an inner periphery of a balance piston diaphragm, the balance piston diaphragm having an outer periphery fixed to the inside wall of the valve main body for defining a balance chamber which receives the air pressure from the output chamber proving a balancing force to resist the pressure force in the control chamber, a first and second plurality of radially extending fins have upper slanted surfaces which contact the adjacent surface of the balanced piston diaphragm, and the first and second plurality of the radially extending fins have lower slanted surfaces which contact the adjacent surface of the control piston diaphragm.

2. The railway car pressure control valve as defined in claim 1, wherein the adjustable middle body member is moved to a desired position by manually rotating a threaded screw.

3. The railway car pressure control valve as defined in claim 1, wherein the first plurality of the radially extending fins are attached to the wall in main valve body.

4. The railway car pressure control valve as defined in claim 1, wherein the second plurality of the radially extending fins are attached to the balance piston.

5. The railway car pressure control valve as defined in claim 4, wherein the first plurality of radially extending fins are interleaved with the second plurality of the radially extending fins.

6. The railway car pressure control valve as defined in claim 1, wherein the air supply valve is slidably mounted in the middle body member.

7. The railway car pressure control valve as defined in claim 1, wherein the adjustable middle body member is slidably mounted in an inner hole formed in the valve main body.

8. The railway car pressure control valve as defined in claim 2, wherein the adjustable middle body member is spring biased against a tip portion of the threaded screw.

* * * * *